No. 641,586. Patented Jan. 16, 1900.
C. E. & O. D. FRENCH.
COMBINED CLOTHES REEL AND TENT.
(Application filed Sept. 29, 1899.)
(No Model.)
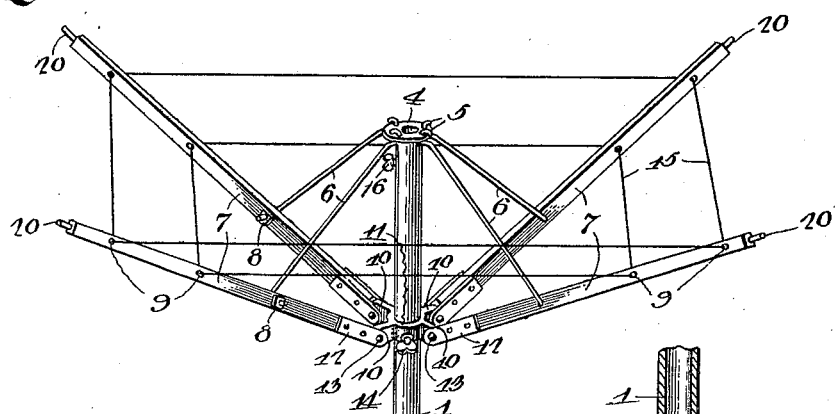

UNITED STATES PATENT OFFICE.

CARL E. FRENCH AND OSCAR D. FRENCH, OF MONTICELLO, IOWA.

COMBINED CLOTHES-REEL AND TENT.

SPECIFICATION forming part of Letters Patent No. 641,586, dated January 16, 1900.

Application filed September 29, 1899. Serial No. 732,093. (No model.)

*To all whom it may concern:*

Be it known that we, CARL E. FRENCH and OSCAR D. FRENCH, citizens of the United States, residing at Monticello, in the county of Jones and State of Iowa, have invented a new and useful Combined Clothes-Reel and Tent, of which the following is a specification.

The invention relates to improvements in combined clothes-reels and tents.

The object of the present invention is to improve the construction of combined tents and clothes-reels and to provide a simple and comparatively inexpensive one adapted to be compactly folded, so that it may be carried conveniently on a picnic or the like and capable of being readily arranged for drying clothes or to provide a tent or awning.

The invention consists in the construction and novel combination and arrangement of parts hereinafter fully described, illustrated in the accompanying drawings, and pointed out in the claim hereto appended.

In the drawings, Figure 1 is a perspective view of the device constructed in accordance with this invention, the tent-cloth and the pole being removed. Fig. 2 is a vertical sectional view of the upper portion of the same, the tent-cloth being in position. Fig. 3 is a detail perspective view of the sliding sleeve or head. Fig. 4 is a detail sectional view illustrating the manner of pivoting the tubular standard.

Like numerals of reference designate corresponding parts in all the figures of the drawings.

1 designates a tubular standard mounted upon a vertical pivot or stake 2, having a pointed lower end and adapted to be readily driven into the ground at any desired point, and a washer or plate 3 is arranged on the pivot at the surface of the ground to form a bearing for the lower end of the tubular standard. The tubular standard is provided at its upper end with a flange 4, having perforations for the reception of hooks 5 of bracing-rods 6, pivoted at their lower terminals to supporting-arms 7 and adapted to maintain the same at the desired inclination. The lower terminals of the bearing-rods are preferably bent at right angles to form pivots for the clothes-supporting arms 7, and they are threaded for the reception of nuts 8, but any other suitable fastening device may be employed.

The clothes-supporting arms 7, which are provided with perforations 9, are hinged to perforated ears or lugs 10 of a sliding collar or head 11, which is mounted on the tubular stem and which is adapted to be raised and lowered to change the position of the arms 7 and to fold the device. The inner ends of the arms 7 are provided with plates 12, arranged in pairs and perforated to receive the pivots 13, which connect the arms with the collar or head 11, and the latter is provided with a threaded opening receiving the set-screw 14, arranged to engage the tubular standard, whereby the device is locked at the desired adjustment. By sliding the collar or head 11 upward and downward the arms 7 may be arranged in a horizontal position or extended upward or downward from such position, as desired.

The clothes to be dried are secured by clothes-pins or other suitable devices upon lines 15, consisting of wires or the like extending across the space between the arms and passing through the perforations thereof, and any number of these wires may be provided, as will be readily understood.

The tubular standard is provided near its upper end with a fastening device 16, adapted to secure a pole 17 at the desired adjustment, and the said pole 17, which supports a tent-cloth 18, fits within the upper end of the tubular standard and is adapted to be raised and lowered. The rod or pole 17, which is detachable, is provided at its upper end with a projection or pin 19 for engaging the tent-cloth, and the arms 7 are provided at their outer terminals with similar projections or pins 20 for engaging openings for eyelets of the said tent-cloth. The arms are also adapted to support the tent sides 21, which may be readily placed in position when the supporting-arms are partially collapsed, and the tent-cloth may be attached to the desired extent by adjusting the arms and the rod or pole 17.

The tent is adapted to be employed when the device is not in use for drying clothes, and as it folds compactly the entire device may be conveniently carried on a picnic. When the tent sides are not used, the tent-cloth 18 forms an efficient awning. Also it has been found advantageous to use the tent-cloth 18 in districts adjacent to railroads, as the tent-cloth does not materially interfere with the drying of the clothes, and at the same time will protect them from the cinders thrown off by locomotives and other engines.

Changes in the form, proportion, size, and the minor details of construction within the scope of the appended claim may be resorted to without departing from the spirit or sacrificing any of the advantages of this invention.

What is claimed is—

A combined clothes-reel and tent comprising a tubular standard adapted to receive a stake in its lower end, whereby it may be readily supported in an upright position, a head slidingly mounted on the standard, arms hinged at their inner ends to the head, and provided at their outer ends with means for engaging a tent-cloth, bracing-rods permanently hinged to the top of the standard and connected at their lower ends to the arms, a removable tent-cloth engaged by the arms, the tent pole or rod detachably fitted in the upper end of the tubular standard and supporting the center of the tent-cloth, and means for securing the tent pole or rod at the desired adjustment, substantially as described.

In testimony that we claim the foregoing as our own we have hereto affixed our signatures in the presence of two witnesses.

CARL E. FRENCH.
OSCAR D. FRENCH.

Witnesses:
A. G. HANKEN,
W. F. BINGHAM.